United States Patent Office 3,436,518
Patented Apr. 1, 1969

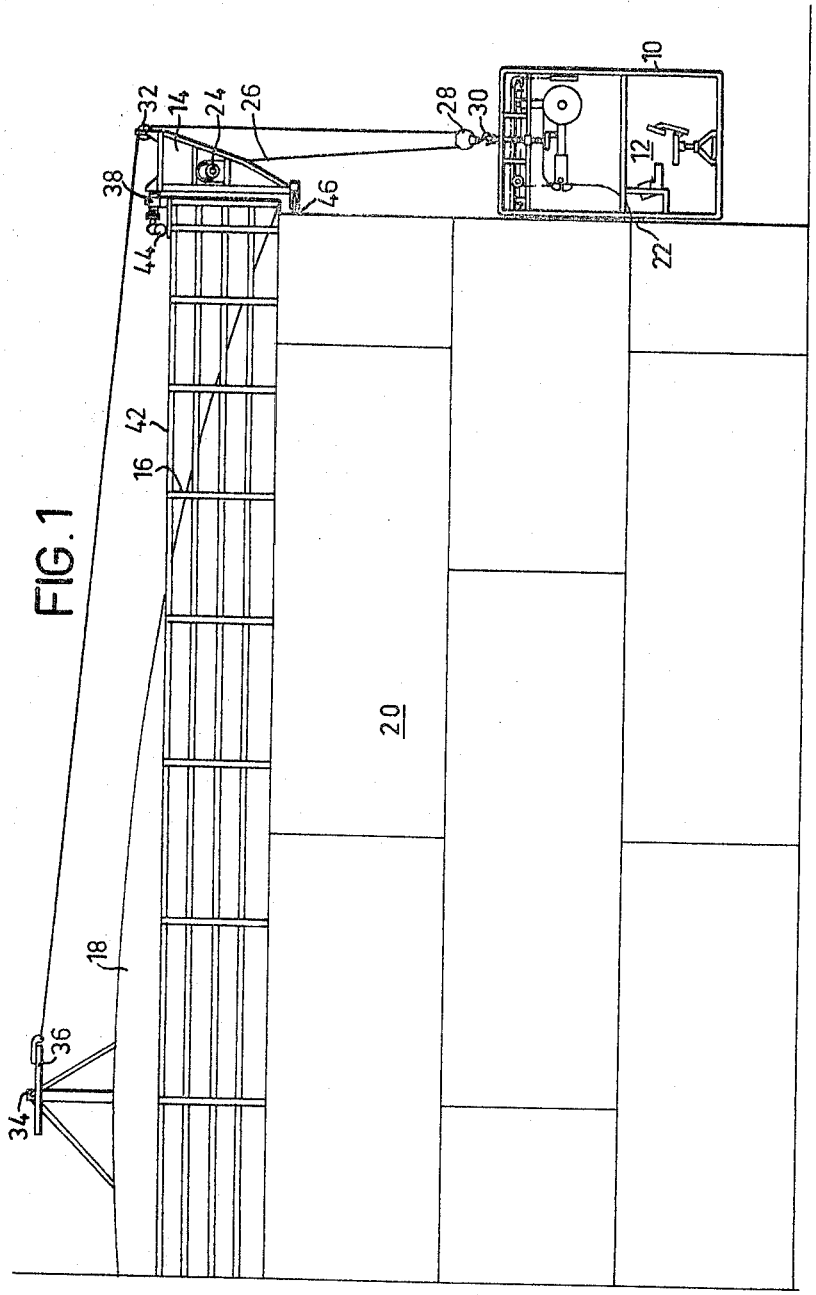

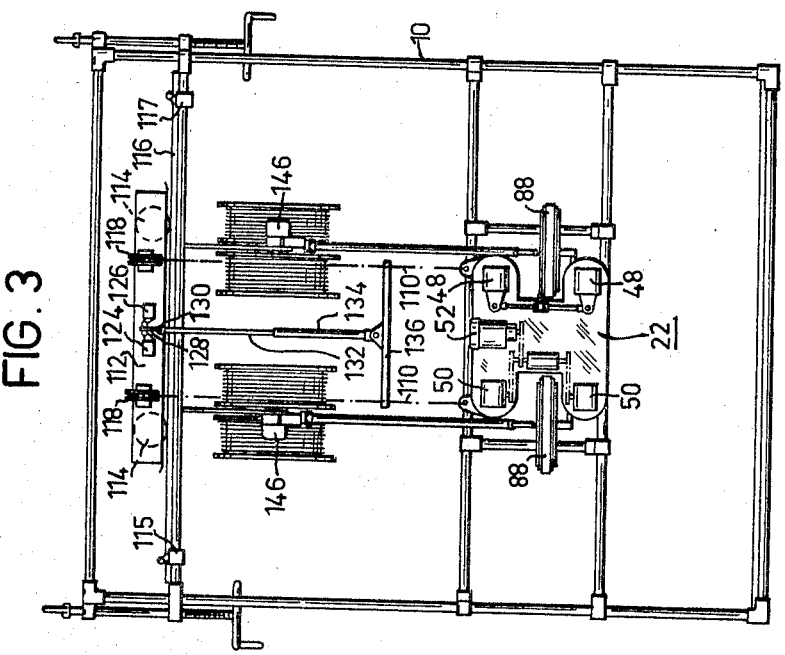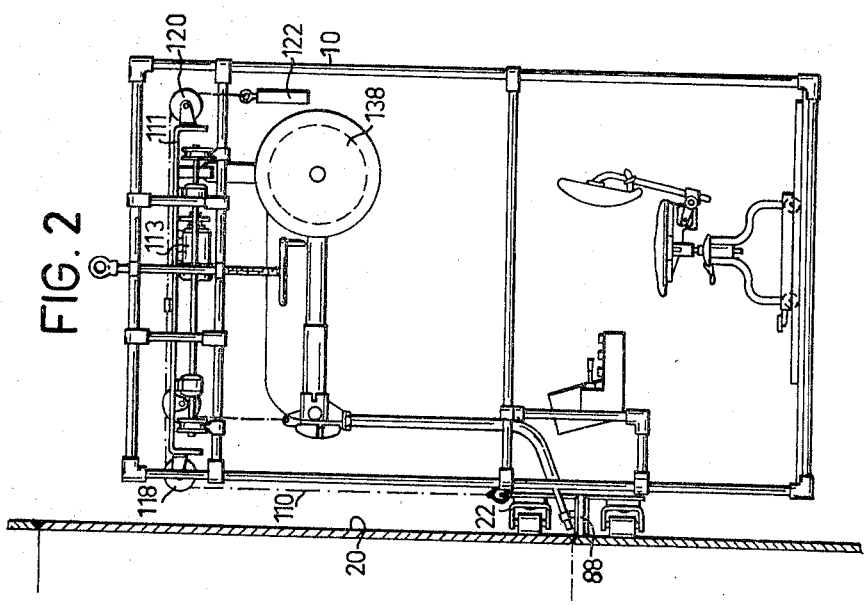

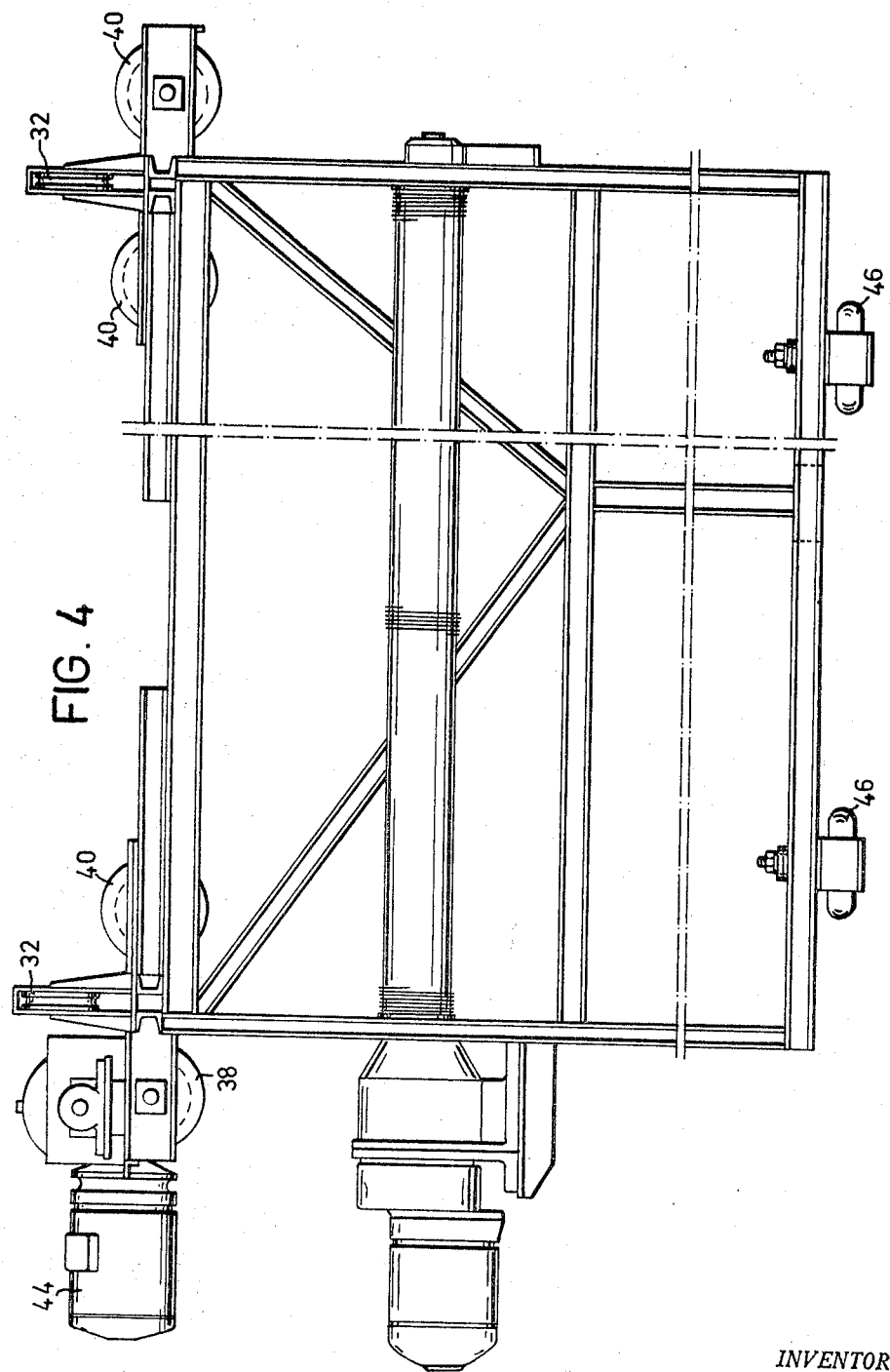

3,436,518
APPARATUS FOR AUTOMATIC WELDING OF SHEET METAL SHELLS, ESPECIALLY CISTERN SHELLS
Knut Axel Waldemar Persson, Trollbacken, Sweden, assignor to AB Broderna Hedlund, Stockholm, Sweden
Filed Apr. 18, 1966, Ser. No. 543,215
Claims priority, application Sweden, Apr. 21, 1965, 5,170/65
Int. Cl. B23k 9/12
U.S. Cl. 219—126   6 Claims

ABSTRACT OF THE DISCLOSURE

Large sheet metal tanks are welded by suspending a cage from a trolley running on the tank edge. The welder rides in the cage, which also supports a guide carriage for guiding welding material. The guide carriage is suspended from a carrier on the cage, and the carrier automatically follows the advance of the guide carriage.

---

Figure 5:
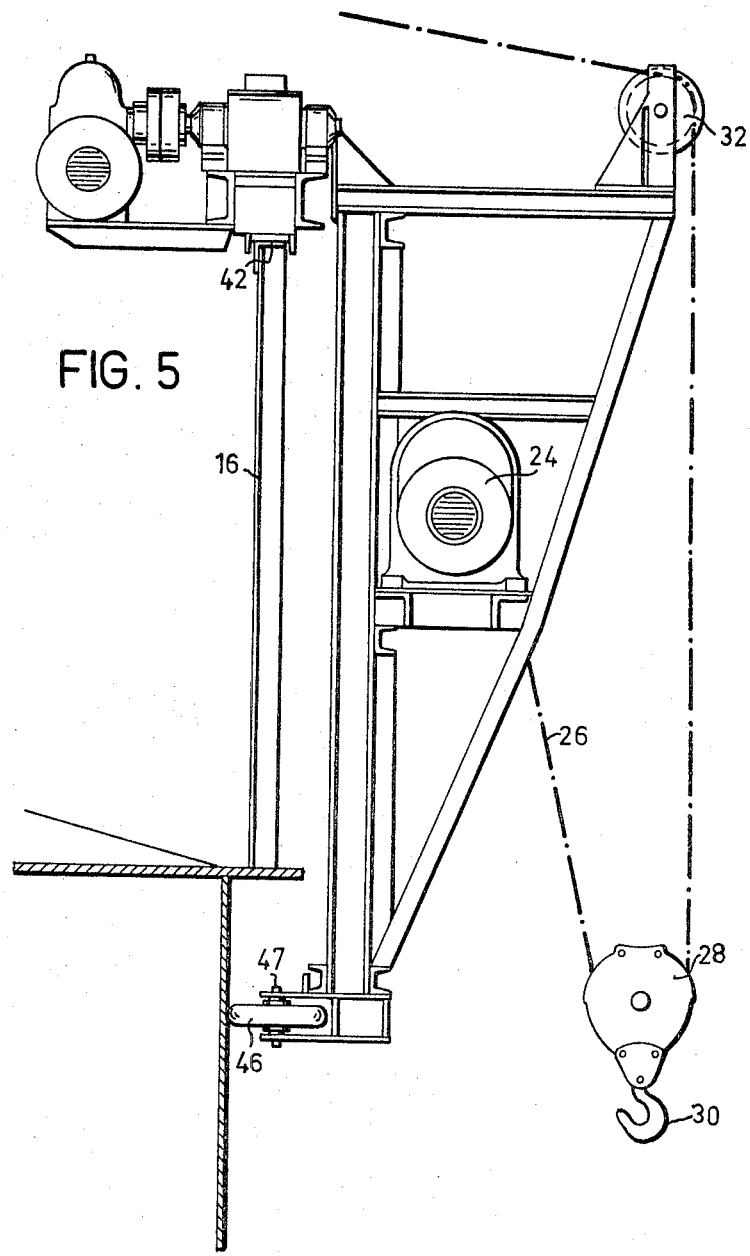

Sheet metal cisterns or tanks are built in different ways. According to one method a lower cylindrical ring or section is assembled of pieces of sheet metal which are joined at their vertical edges whereupon additional rings or sections are built upon the lower one to the total height of the tank whereupon the roof is mounted thereon. According to another method the roof of the tank and the uppermost ring or section are first assembled whereupon the assembly thus obtained is lifted by means of jacks so that the next section can be applied whereupon this section together with the uppermost section and the roof is lifted to make room for an additional section and so on until the entire tank is finished. According to a third method the shell is made up of a helically extending course so that the seams extend along ascending helices.

In carrying out the first-named method a carriage provided with a welding set travels on the top edge of the uppermost section for welding an underlying seam. In this case the welding head is guided by the edge of the section. In application of the second method the welding set is mounted on a carriage travelling on the bottom of the tank and is guided by means of a steering roller which runs in the joint to be welded. This arrangement has among others the disadvantage that the steering roller will not guide accurately if one or more additional beads are to be applied to a previously welded bead.

This invention relates to an apparatus for welding seams in a sheet metal shell, especially tank shell, and the object of the invention is to provide an apparatus that permits automatic welding of shell joints located anywhere on the tank or similar structure. The apparatus can be used not only for tanks which are built up from below and tanks which are assembled from above, but also for welding helically extending shell seams. The apparatus can be used for tanks of other than cylindrical shape and for welding together the plates of the hull of a ship or similar structures of other than cylindrical shape. Due to the invention it is possible first to assemble and tack weld the entire shell and thereafter automatically to weld the shell externally and internally in succession.

In its broadest aspect the apparatus according to the invention is characterized by a cage or cabin movable along the shell and including a control place for a welder, a trolley for carrying the cage, and a carriage for guiding weld material relative to the welding zone, said carriage being movable relative to the cage and adapted by its movement to control the movement of the cage along the shell. The carriage that guides the weld material may have wheels which by magnetic force are maintained in contact with the surface of the shell, one or a pair of said wheels being steerable and one or a pair of said wheels being motor driven. As a result the guide carriage can be held in contact with the surface of the shell by a force sufficient to guide the carriage accurately and to place the welding members into correct positions relative to the weld joint.

Figure 6:
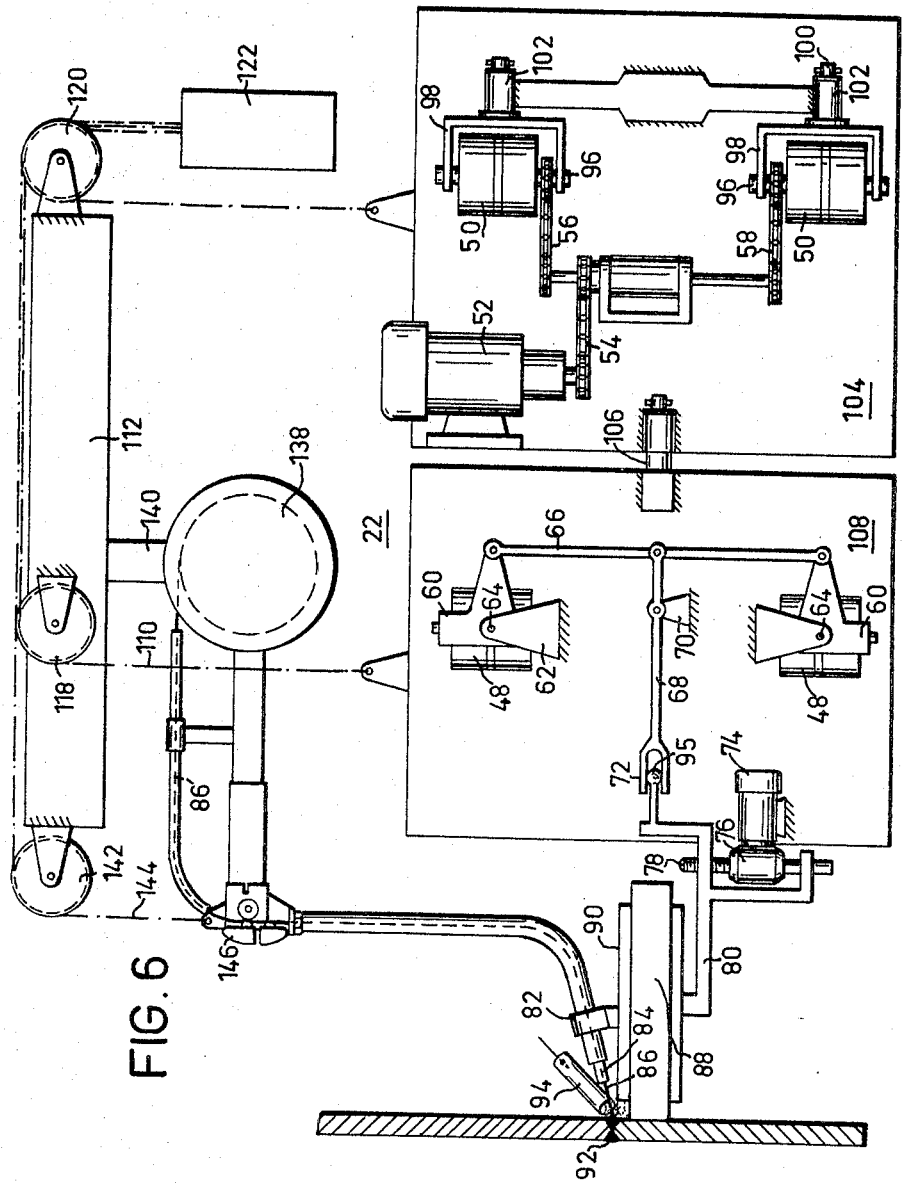

Additional features of the invention will appear from the following description of an embodiment illustrated in the annexed drawings. The embodiment illustrated is an apparatus for external welding of tank shells which are built up starting from the roof. FIG. 1 is a vertical projection of the main part of a tank under erection together with a welding apparatus mounted thereon. FIG. 2 is an enlarged side elevation of the cage or cabin comprised in the apparatus, FIG. 3 illustrates the cage as viewed from the cistern, FIGS. 4 and 5 are elevational views of the cage-carrying trolley taken at right angles to each other, FIG. 5 illustrating the trolley in the position in which it is supported by a railing on the roof of the cistern, and FIG. 6 is an enlarged elevational view of a carriage for guiding the weld material relative to the seam, this view being taken in a position in which the carriage is swung outward from the wall of the tank.

Generally, the apparatus comprises a cage or cabin 10 having a control place 12 for a welder, a trolley 14 adapted to roll on a railing 16 or the like which in case of external welding is mounted on the roof 18 of the tank or cistern shell 20 to be welded, and a guide carriage 22 disposed in the cage. The trolley 14 is provided with a windlass 24 for a lift wire or rope 26 which passes through a block 28 having a hook 30 and then over a guide pulley 32 to an attachment 36 which is turnable about a central bearing 34 of the roof 18 of the tank or cistern. Preferably, there are provided two lift wires or ropes 26 passing through blocks with hooks on either side of the lateral edge of the roof of the cage 10 and both secured to the centrally turnable attachment 36. The trolley has driving wheels 38 and idler wheels 40, all of said wheels rolling on a path 42 at the top edge of the railing 16. The wheels 38 are driven by a traction motor 44. The trolley also has backing wheels 46 which are rotatable about vertical axles 47 and are in contact with the shell of the cistern.

The carriage 22 which guides the weld material has supporting wheels which are maintained in contact with the surface of the cistern shell by magnetic forces, suitably exerted by electromagnets disposed in the wheels. Two wheels 48 are steerable whereas the other two wheels 50 are driven by a motor 52 through a chain transmission 54, 56, 58 (FIG. 6). In order to be steerable, the guide wheels 48 have their axles mounted on forks 60 adapted to be turned about shafts 64 mounted in bearing brackets 62. The forks 60 are articulated to a tie rod 66 which in turn is articulated to the shorter arm of a two-armed lever 68 which is mounted on a bearing bracket 70 and the end of the longer arm of which is bifurcated at 72. A control motor 74 drives a nut 76 through which extends a cooperating screw 78 which is screwed into and carries a frame 80. This frame forms part of a device which carries attachments 82 for nozzles 84 for welding wires 86. The device comprises an endless band 88 of for instance rubber which runs about a pair of pulleys 90 mounted on vertical shafts. During the welding operation the upper edge of the band 88 is located immediately below the weld joint 92, FIG. 6, and carries powder supplied to the welding point through a tube 94 which also is guided by the device 80. Due to the fact that the lever 68 has arms of different lengths and that the longer arm is coupled to the device 80 such as by means of a ball 95 engaging the fork 72 a guiding movement of the guide wheels 48 will correspond to a greater upward and downward movement of the endless band 88 which moves on the shell of the cistern. Consequently, the band will be accurately guided relative to the weld joint.

The axles 96 of the wheels 50 are mounted in forks 98 which by means of shafts 100 extending at right angles to the axles 96 are mounted in fixed bearings 102. The bearings 102 are mounted on a plate 104 which carries the wheels 50 and their driving means and which by means of a hinge 106 is connected to a similar plate 108 on which the guide wheels and the control members thereof are mounted. Due to this arrangement each wheel can be maintained in effective contact with the shell of the cistern in spite of the curvature of the shell and irregularities of the sheet metal.

The guide carriage 22 is suspended in the cage 10 by means of ropes 110 hanging down from a carrier which is movable parallel to the shell of the cistern so as to permit movement of the guide carriage relative to the cage. In FIGS. 2 and 3 the carrier is represented by a supporting carriage 111 comprising a frame 112 and wheels 114 which roll on rails 116 in the upper part of the cage 10. The frame 112 carries guide pulleys 118 for the two ropes 110 on the side of the cage 10 facing the shell of the cistern and guide pulleys 120 on the opposite side of the cage. Counterweights 122 at the ends of the ropes are provided for balancing the guide carriage and the parts carried thereby.

The apparatus comprises means responsive to the movement of the guide carriage along the seam relative to the supporting carriage 111, said means being adapted to start a drive motor 113 for the supporting carriage 111 such that said carriage will follow the movement of the guide carriage along the shell of the cistern. The means responsive to the movement of the guide carriage consists of a contact device comprising two contacts 124, 126 and an intermediate control pin 128 which forms one end of a lever 132 fulcrumed on the frame 112 at 130. The lever extends freely down into the end of a tube 134 mounted on a bridge 136 the ends of which are secured to the ropes 110. If the suspension ropes 110 of the guide carriage deviate from their vertical positions the tube 134 will actuate the lever 132 which will engage one or the other of the contacts 124, 126 which are connected to the motor 113. Upon engagement of the contact 124 the motor 113 will rotate in one direction and upon engagement of the contact 126 the motor will rotate in the opposite direction. Consequently, depending on the inclination of the suspension ropes 110 the motor 113 will move the supporting carriage 111 in one or the other direction along the shell of the cistern such that the supporting carriage 111 will follow the movements of the guide carriage.

The supporting carriage is movable along the rails 116 between two end positions defined by a pair of contacts 115, 117 (FIG. 3). Since the speed of the cage 10 generally cannot be exactly equal to the speed of the supporting carriage 111, this carriage may arrive at one or the other end position during the welding operation so as to actuate the contact 115 or 117. As a result the motor 44 of the trolley 14 will be started to move the cage forward or backward along the shell of the cistern until the guide carriage and consequently the supporting carriage are located approximately in the cage.

The welding wires 86 are taken from supply rollers 138 which are mounted in bearings in brackets 140 depending from the frame 112. The frame also supports a bearing for a guide pulley 142 for a carrying rope 144 one end of which carries a feed motor 146 for the welding wire 86 and the other end of which passes over the guide pulley 120 to the counterweight 122. As will be seen from FIG. 3, the guide carriage 22 is provided with two nozzles for welding wires and two endless bands for carrying welding powder so that it is possible by means of the apparatus to apply a plurality of weld beads one upon the other.

In principle the apparatus described can be used for internal welding of cisterns. Usually the plates are provided on the inside with bosses or lugs for lifting the plates. These bosses may be used as attachments for the path on which the trolley is to be moved. In case of internal welding the cage can travel on rails on the bottom of the cistern. In this case the trolley can be avoided.

Due to the guide carriage and the means for suspending, advancing and guiding thereof it is possible with the apparatus described exactly to follow the joint during the welding operation no matter whether the joint is horizontal or inclined. Due to the construction of the guide carriage the apparatus can also be used for welding together plates of other than cylindrical shape, for instance for skin plating of ships.

I claim:
1. An apparatus for welding seams in a sheet metal shell, especially tank shell, comprising a cage movable along the shell and including a control place for a welder, a trolley for carrying the cage, a carriage for guiding weld material relative to the welding zone, said carriage having wheels, one wheel being steerable and another being motor driven to move the carriage to control the movement of the cage along the shell, a carrier movable in said cage parallel to the sheet metal shell, deflectable means depending from said carrier to the guide carriage to carry the latter, and means responsive to the movement of the guide carriage along the seam relative to the cage and adapted to start a drive motor for the carrier which is in the form of a supporting carriage adapted to follow the movement of the guide carriage along the sheet metal shell.

2. An apparatus for welding seams in a sheet metal shell, comprising a cage having a control station for a welder, a trolley carrying the cage, track means on which the trolley runs along a portion of the shell to be welded, a carrier mounted on the cage for movement relative to the cage in the direction of movement of the trolley along the track means, a guide carriage carried by said carrier for guiding weld material relative to the welding zone, motor means for driving said carrier along the shell, and means responsive to the movement of said guide carriage along the shell relative to the cage to actuate said motor means.

3. An apparatus as claimed in claim 2, and means suspending said guide carriage from said carrier, said responsive means comprising means responsive to deflection of said suspension means from an upright position.

4. An apparatus for welding seams in a sheet metal shell, comprising a cage having a control station for a welder, a trolley carrying the cage, track means on which the trolley is mounted for movement along the shell, a guide carriage carried by the cage for guiding welding material relative to the welding zone, said guide carriage having wheels on which the guide carriage rolls on the shell, at least one of said wheels being steerable, said guide carriage supporting guide pulleys on which is disposed an endless band that rolls on the sheet metal shell to carry powdered material for covering the welding zone, and control means coupled to said at least one steerable wheel of the guide carriage and responsive to movements of said at least one steerable wheel relative to said guide carriage to position said guide pulleys so as to maintain said endless band in correct position relative to the welding zone.

5. An apparatus as claimed in claim 2, said trolley having supporting wheels that roll on said track means and having backing wheels that roll on the side of the sheet metal shell, and a lift rope that supports the cage and is secured at one end to the trolley and at the other end to a central portion of the sheet metal shell.

6. An apparatus as claimed in claim 5, and winding means on said trolley about which said one end of said lift rope is disposed for winding and unwinding said rope to raise and lower said cage.

References Cited

UNITED STATES PATENTS

| | | | |
|---|---|---|---|
| 1,965,331 | 7/1934 | Chapman | 219—125 |
| 2,395,723 | 2/1946 | Chmielewski | 219—126 |
| 2,781,441 | 2/1957 | Ballentine et al. | 219—126 |
| 2,866,078 | 12/1958 | Ballentine et al. | 219—126 |
| 2,969,454 | 1/1961 | Lucey | 219—126 |
| 3,164,714 | 1/1965 | Swan et al. | 219—126 |
| 3,249,733 | 5/1966 | Santilhano | 219—126 |
| 3,255,944 | 6/1966 | Yadron et al. | 219—126 |

RICHARD M. WOOD, *Primary Examiner.*

W. D. BROOKS, *Assistant Examiner.*